Figure 1:
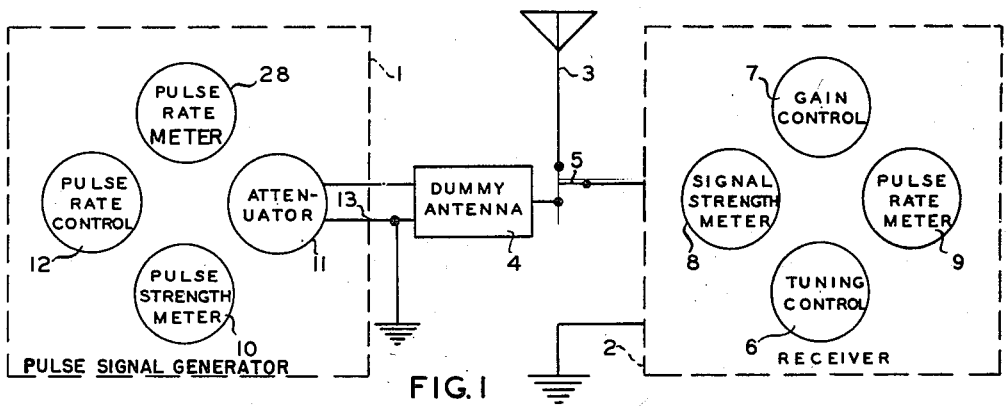

Jan. 15, 1952  H. C. GOODRICH, JR  2,582,247
STANDARD IMPULSE NOISE GENERATOR
Filed Oct. 16, 1945  2 SHEETS—SHEET 1

INVENTOR
HUNTER C. GOODRICH, JR

BY
*William D. Hall.*
ATTORNEY

Jan. 15, 1952     H. C. GOODRICH, JR     2,582,247
STANDARD IMPULSE NOISE GENERATOR

Filed Oct. 16, 1945     2 SHEETS—SHEET 2

INVENTOR
HUNTER C. GOODRICH, JR.
BY
*William D. Hall.*
ATTORNEY

Patented Jan. 15, 1952

2,582,247

UNITED STATES PATENT OFFICE 2,582,247

STANDARD IMPULSE NOISE GENERATOR

Hunter C. Goodrich, Jr., Detroit, Mich.

Application October 16, 1945, Serial No. 622,640

3 Claims. (Cl. 250—36)

(Granted under the act of March 3, 1883, as
amended April 30, 1928; 370 O. G. 757)

The invention described herein may be manufactured and used by or for the Government for governmental purposes, without the payment to me of any royalty thereon.

My invention relates to standard signal generators, particularly to a standard signal generator which generates a train of pulse signals rather than a continuous wave signal.

In the study of interference in radio reception it is desirable to have a standard interfering signal against which to measure quantitatively the degree of interference produced by various radiating agencies and also to measure quantitatively the degree of response of a receiving system to interference. In the prior art there are known devices for measuring interference from signals having the character of a constant continuous wave of a signal frequency. The more important and difficult types of interference signals to be studied are those of an impulse character. In particular, methods for studying the interference produced by the spark discharge in a gas engine are needed. In this case the impulses of discharge are produced at a fairly constant repetition rate. My invention is particularly adapted to the study of radio interference produced by gas engines.

A purpose of my invention is to provide a standard noise signal generator.

Another purpose of my invention is to provide a standard electric signal generator of repeated pulses.

Another purpose of my invention is to provide a field strength meter for impulsive signals.

Another purpose of my invention is to provide a generator of a standard pulse signal which shall be permanent and reproducible.

Another purpose of my invention is to provide a method and means for the study and measurement of radio interference produced by gas engines and automobiles.

Another purpose of my invention is to provide a method and means for the study and measurement of response of radio receiver systems to pulse interference.

Another purpose of my invention is to provide means for measuring response characteristics of receiver systems.

Another purpose of my invention is to provide a method and means for measuring response characteristics of radio devices to continuous signals and continuous noise.

Another purpose of my invention is to provide general methods of signal generator technique applicable to a pulse signal generator.

Another purpose of my invention is to provide a pulse oscillator in which the electrical characteristics of the pulse are readily determinable from the circuit constants and meter readings within the oscillator.

Other purposes of my invention will appear in the course of the description thereof which follows.

In accordance with the present invention there is provided a novel pulse signal generator, which is used in a novel manner.

For a better understanding of my invention together with other and further objects thereof, reference is had to the following description taken in connection with the accompanying drawings.

Drawings illustrative of embodiments of my invention comprise the following figures:

Fig. 1 discloses a block diagram of a field intensity measuring system for pulse signals which employs my invention.

Figure 2:
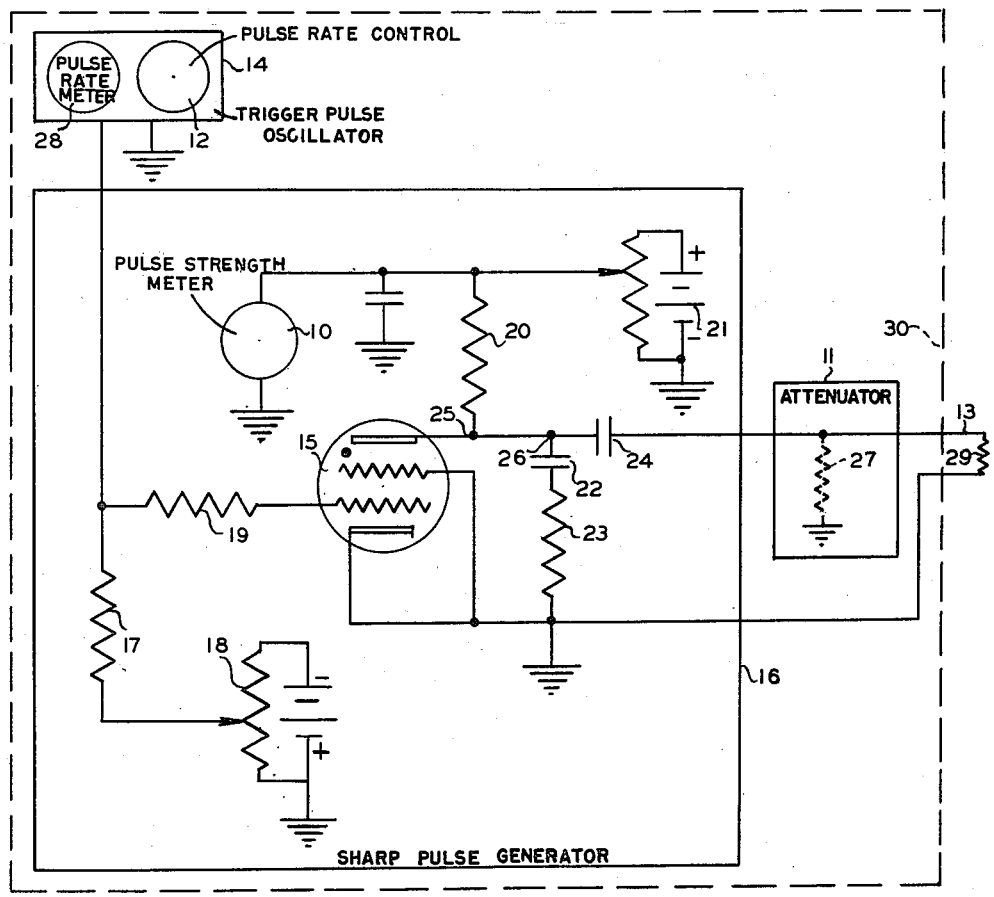

Fig. 2 discloses a circuit diagram for a preferred form of standard pulse signal generator which is employed in my invention.

Figure 3:
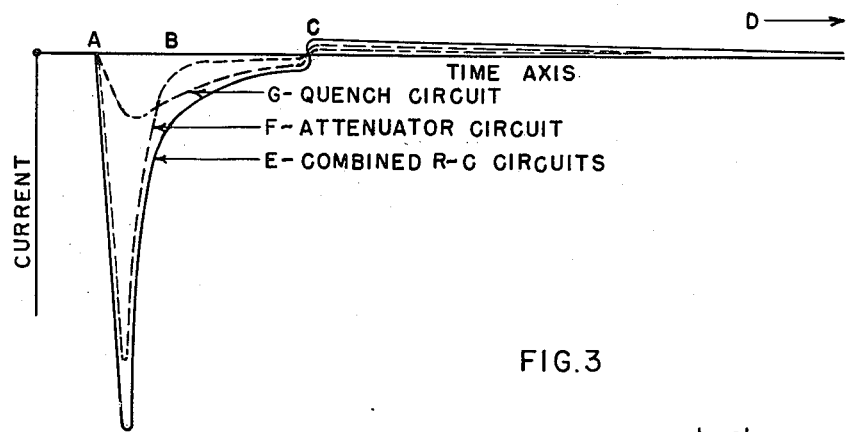

Fig. 3 discloses time-current graphs used to explain my invention.

Figure 4:
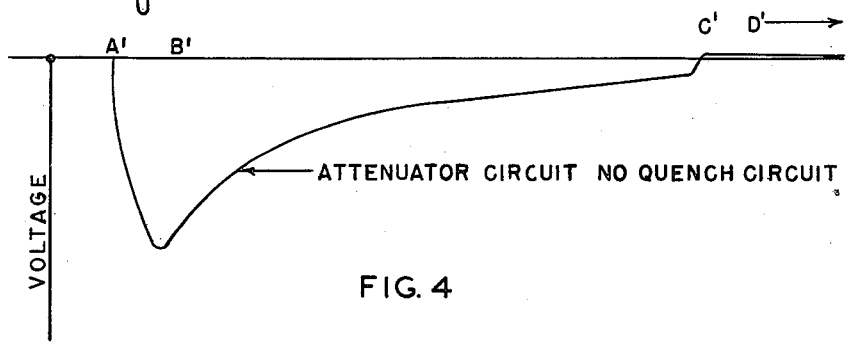

Fig. 4 discloses a time-voltage graph of a sawtooth wave used to explain my invention.

Figure 5:
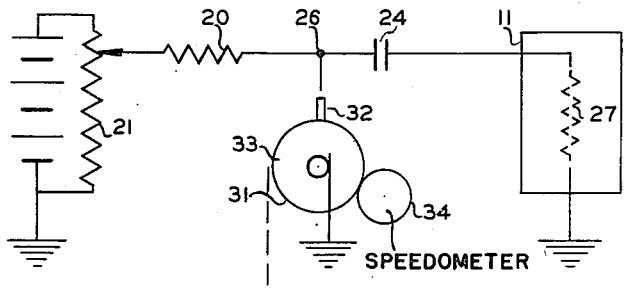

Fig. 5 discloses a modified form of part of the pulse signal generator of my invention.

The system shown in Fig. 1 for measuring the intensity, or field strength, of a pulse signal comprises a standard radio receiver 2 whose input circuit is connected alternatively through a two-way switch 5 to either an antenna 3 or through a dummy antenna 4 and shielded line 13 to a standard pulse signal generator 1.

Standard pulse signal generator 1 is a generator of a train of electric pulses. It contains a pulse strength meter 10, an adjustable attenuator 11, a pulse rate control 12, and a pulse rate meter 28.

Standard receiver 2 is a radio receiver containing a tuning control 6, a gain control 7, a signal strength meter 8, and a pulse rate meter 9. It is constructed preferably to have a standard intermediate frequency pass band width. Signal strength meter 8 is placed in the second detector circuit of receiver 2, which is the normal position for such a meter. The pulse rate meter 9 is placed normally in the audio circuit of receiver 2 and indicates the pulse rate of a received pulse signal. In crude form pulse rate meter 9 and signal strength meter 8 may consist of a speaker to which the operator listens and estimates the pulse rate and signal strength.

Shielded line 13 is a line of low characteristic impedance with grounded return, which is terminated by its characteristic impedance within dummy antenna 4. This termination impedance is low compared to the insertion impedance of dummy antenna 4. Dummy antenna 4 has the same effective insertion impedance as antenna 3, but is shielded from radiation. This is standard practice in the art of field strength measurement.

In operation the equipment is set up with antenna 3 in the place at which the equivalent interference intensity of a pulse type radio field is to be measured. Antenna 3 is of a form for which the conversion factor from output to field strength is known, or else the same antenna is used for all measurements with the system. Antenna 3 is connected to receiver 2 by two-way switch 5. The tuning control 6 and the gain control 7 of receiver 2 are set at appropriate settings and thereafter left fixed during the course of the measurements. The reading of the signal strength meter 8 due to the field under observation is noted. The pulse rate of the received pulse radio signal due to this field is observed on pulse rate meter 9 and noted.

The two-way switch 5 is next turned to disconnect receiver 2 from antenna 3 and to connect it with impulse signal generator 1 through dummy antenna 4 and line 13. The repetition rate of the pulse from the signal generator is then adjusted to be equal to that just previously determined for the field. The adjustment is made by adjustment of pulse rate control 12 and by observation of pulse rate meter 28 or pulse rate meter 9. The attenuator 11 is then adjusted to bring the reading of signal strength meter 8 of standard receiver 2 up to the reading noted for the signal to be measured.

The strength of the standard pulse signal of standard signal generator 1 as read on pulse strength meter 10 divided by the attenuation of attenuator 11 and multiplied by the conversion factor of antenna 3 gives the equivalent interference intensity of the pulse radio field being measured.

Fig. 2 shows in detail a circuit for a preferred form of standard pulse signal generator 1. A trigger pulse oscillator 14 containing a pulse rate control 12 and a pulse rate meter 28 feeds its output in the form of a train of trigger pulses to a sharp pulse generator 16. The sharp pulses which are the output of generator 16 are fed to an adjustable shielded attenuator 11 and thence to shielded line 13.

Trigger pulse oscillator 14 is an oscillator which generates a train of electrical pulses at an audio or sub-audio rate. This rate is controlled by the setting of pulse rate control 12 and observed on pulse rate meter 28. Alternatively the pulse rate control 12 may be calibrated in rate and pulse rate meter 28 dispensed with. The output pulses of trigger pulse oscillator 14 are made as sharp as can be conveniently done by means well known in the art and are applied as positive trigger pulses to sharp pulse generator 16.

The trigger pulses are received in sharp pulse generator 16 across a grid resistor 17, one end of which is grounded through a grid bias supply 18. This trigger pulse is applied through a current limiting resistor 19 to the grid of a gas discharge tube 15, which is preferably a 2D21 type tube, commonly called a thyratron. The grid is normally negatively biased below starting voltage by controllable voltage supply 18. The cathode is grounded. The plate is supplied through a dropping resistor 20 from a controllable plate voltage supply 21. A plate voltmeter 10 is connected between plate voltage supply 21 and ground.

Between the plate and cathode is connected a time-constant circuit comprising a capacitor 24 and the equivalent input resistance 27 of attenuator 11 in series. This equivalent input resistance is virtual and not physical and therefore is shown dotted in the drawing. Between the plate and cathode there is also connected a quenching circuit comprising a resistor 23 and capacitor 22 in series. These are of high resistance and capacity compared to resistor 27 and capacitor 24.

The output of attenuator 11 is fed through shielded line 13 to a matching terminating resistance 29, which is also the input resistance of whatever device is to receive the pulse signal. The return circuit is through the grounded shield.

The operation of my preferred embodiment of standard signal generator 1 as shown in Fig. 2 is as follows: Initially the grid of the thyratron 15 is biased negatively below cut-off voltage of the tube for the plate voltage applied, so that no plate current flows and the plate is at the full potential of the plate voltage supply 21.

Positive triggering pulses from trigger pulse oscillator 14 are applied to the thyratron grid at a rate corresponding to the desired impulse repetition rate. When the grid rises to the starting voltage and the tube fires, the discharge path is through the tube 15, resistance 27, and capacitor 24. Capacitor 24 very quickly discharges; during the course of the discharge the voltage across resistor 27 very quickly falls below ground and rises again. After the substantially complete discharge of capacitor 24 capacitor 22 continues the discharge over a considerably longer period of time determined by the time constant of capacitor 22 and resistor 23. Capacitor 22 prevents a rapid rise in thyratron plate voltage; and because of the negative resistance characteristic of the thyratron arc this causes the arc to extinguish. It is advantageous to have the relatively slow discharge circuit composed of capacitor 22 and 23 across the thyratron, in order to secure a regular periodic discharge; as due to residual ionization a thyratron cannot be made to quench reliably at rates greatly in excess of 50,000 cycles.

After the thyratron has been quenched capacitors 22 and 24 recharge slowly from voltage supply 21 through resistor 20 up to the full voltage of the voltage supply. Resistor 20 is large compared to resistor 23 so as to insure that the plate voltage will drop far enough for the thyratron to quench. The action of the circuit is such that there is a single negative pulse through resistor 27.

During the time of discharge of capacitor 22 and in the ensuing charging interval the trigger pulse on the grid of tube 15 has time to subside and the grid returns to normal bias. The tube 15 can not strike again until the next pulse arrives from trigger pulse oscillator 14.

The current and voltage relations during a cycle are shown in Fig. 3. There curve E exhibits qualitatively the combined current flow of both R—C circuits between points 25 and 26 of Fig. 2 during a cycle. The part of the curve below the time axis indicates current towards the plate, the part above the time axis indicates current towards capacitor 22. Curve F exhibits qualitatively current through (and voltage across), resistor 27 during a cycle; the part below the time axis indicates voltage below ground, the part above voltage above ground. The sharp pulse occurs during the interval between A and B. Curve G is merely the difference between these, or quench circuit current. The long time constant of curve G relative to curve F is readily apparent. The tube quenches at C and the capacitors 22 and 24 charge during the interval C to D.

Capacitor 24 and resistance 27 may be reduced until the time of the sharp pulse is of the order of .01 microsecond.

It may be shown that the important quantitative measure of the pulse signal is a quantity which I shall call the pulse strength. The pulse strength P is defined as the time-voltage integral over the pulse interval $$P = \int_A^B E\,dt$$

where E is the voltage across resistance 27, and $t$ is time.

The following relations hold:

$$\int_A^B E\,dt = R_{27}\int_A^B I\,dt = R_{27}C_{24}(E_{21}-E_0)$$

where

I = current in resistance 27
$R_{27}$ = resistance 27
$C_{24}$ = capacitance of capacitor 24
$E_{21}$ = plate voltage supply
$E_0$ = cut-off voltage of tube 15 (for a 2D21 tube about 8 volts).

All of the quantities in the right hand member are readily determinable. $E_{21}$ may be read directly on plate voltmeter 10, and since all the other quantities are constants, plate voltmeter 10 may be calibrated to read pulse strength directly. For this reason I call it the pulse strength meter.

The signal output from sharp pulse generator 16 is a standard pulse signal, since its essential characteristics, namely, pulse strength and pulse rate, are measured.

Attenuator 11 receives the standard sharp pulse across its input terminals. It has a constant purely resistive input impedance for the range of frequencies over which the pulse signal generator is designed to apply. It is adjustable in attenuation by known gradations and feeds its output without distortion to a matching low impedance lossless shielded line 13 terminated by the external load 29 which supplies the proper characteristic impedance termination. The return circuit is through ground.

The signal generator is constructed with stray impedances reduced to a minimum and a shield 30 completely encloses it.

The output of the pulse signal generator 1 is a train of pulses. The pulse strength of the output is the pulse strength as read on pulse strength meter 10 divided by the attenuation of attenuator 11. The pulse rate is the rate of trigger oscillator 14 as read on pulse rate meter 28.

The standard pulse signal of my pulse signal generator 1 approximates closely to a train of extremely narrow unilateral pulses separated by long intervals of constant voltage. This constant voltage is very close to zero but it is the constancy of the voltage in the interval and the narrow width and the unilateral nature of the pulse that is essential.

The Fourier series analysis of a train of pulses standing upon a constant base line is an adequate representation of my pulse signal. The analysis shows that the pulse train may be resolved into a Fourier series of a fundamental having the frequency of the pulse rate F and an unbroken series of the harmonics thereof all in like phase. The amplitude of the fundamental $A_0$ is given by the Fourier analysis as $$A_0 = 2PF$$

The amplitudes of succeeding harmonics decrease slowly from this value. For a sufficiently sharp pulse the amplitudes decrease very slowly out to a high order of harmonic regardless of the wave form of the pulse. Thus I have found that the harmonic series of the pulse from one pulse signal generator embodying my invention showed amplitudes not less than .9 $A_0$ for the harmonics up to 25 mc. and down from $A_0$ only 7 db. out to 50 mc. Some indication was found of all harmonics out to the frequency which was the reciprocal of the pulse width.

It may be shown that for a triangular pulse, which the pulse of my signal generator approximates, the harmonics decrease gradually from $A_0$ to .95 $A_0$ at the harmonic whose frequency is one-fourth the reciprocal of the pulse width. The amplitude is still .80 $A_0$ at the harmonic of twice this frequency. The frequency interval between the harmonics is the pulse repetition rate, so that the harmonics in the radio range are very close together. Thus the signal from my pulse signal generator fills the complete pass band of any receiver within its range of application with a dense set of signals of constant known amplitude.

If desired, resistors 20 and 23 and capacitors 22 and 24 may be made adjustable so as to increase the flexibility of the signal generator; but I prefer to make them fixed in order to reduce harmful stray impedances and to preserve a more constant standard pulse signal.

I have found that the pulse characteristics of pulse signal generators employing my sharp pulse generator 16 are independent of the particular thyratron tube used or of the age or environment of the tube.

In a specific embodiment of my invention the gaseous discharge tube was a 2D21 and the components had the following values:

$R_{20}$ = .25 megohm
$R_{23}$ = 2000 ohms
$R_{27}$ = 50 ohms
$C_{22}$ = .001 microfarad
$C_{24}$ = 5 micromicrofarads
$E_{21}$ = 408 volts
$E_0$ = 8 volts From these data the pulse strength P, or time-voltage integral, of the standard pulse signal is computed as .10 sec.-microvolt.

It is to be observed that the standard pulse strength of my signal generator may be increased by increasing the resistance 27 or the capacity of capacitor 24, or both. This tends to broaden the pulse, and thus curtails the upward extent of the flat portion of the harmonic range, but for use of the signal generator with receivers having their frequency coverage within this curtailed range this is not a detriment.

For values of resistance 27 and capacitor 24 giving a sufficiently large time constant, capacitor 22 and resistor 23 are not necessary to insure quenching of the tube 15 and may be omitted.

In the case that capacitor 22 and resistor 23 are omitted the voltage across resistance 27 is as represented in Fig. 4. The wave form is seen to be saw-toothed with one side very steep. The discharge of stray capacitance across resistance 27 occurs through tube 15 during the interval A' to B' and furnishes the preponderating contribution to the high frequencies of the harmonic series. The discharging of capacitor 24 is continued during the interval B' to C'. Recharging is accomplished during the interval C' to D', as in Fig. 3.

The voltage across resistance 27 in the interval B' to C' is given by $$(E_{21}-E_0)e^{-t/R_{27}C_{24}}$$

$t$ being measured from B', and the amplitude of the higher harmonics of the wave are given by $$A_n = (E_{21}-E_0)\frac{1}{\pi\sqrt{k^2+n^2}}$$

where $n$=order of harmonic
$A_n$=amplitude of harmonic of order $n$
$k=(2\pi F R_{27}C_{24})-1$ and other symbols have their previous meaning. By proper choice of circuit parameters, $k$ may be kept preponderantly larger than $n$ even up to quite high $n$, and the harmonic amplitudes are then uniform. The effective pulse strength may then still be taken as $$P=R_{27}C_{24}(E_{21}-E_0)$$

A further modification of my pulse signal generator is shown in Fig. 5.

In this form voltage supply 21, resistor 20, capacitor 24 and attenuator 11 are shown connected together in series as in Fig. 2, but capacitor 22 and resistor 23 have been omitted. In place of trigger pulse oscillator 14 and gas tube 15 there is shown a mechanical intermittent switch 31 connected between point 26 and ground. In switch 31 contact 32 is carried on a rapidly rotating disc 33, through which the contact is grounded. Disc 33 is driven by variable speed motor 35 which is supplied by an adjustable voltage supply 36. A speedometer 34 is calibrated to indicate the frequency at which contact 32 makes contacts, which is the pulse repetition rate. It is seen that capacitor 24 is discharged through resistance 27 by closing of contact 32. The duration of this closing is made as brief as possible. There is thus produced by this device a voltage wave in resistance 27 of the form shown in Fig. 4. The character of this wave is as described above for the gas tube circuit without capacitor 22 or resistor 23. For this wave the amplitudes of component harmonics is given by $$A_n = E_{21}\frac{1}{\pi\sqrt{k^2+n^2}}$$

The pulse strength is given by $$P=R_{27}C_{24}E_{21}$$

Those parts of the further modification of my signal generator which are not shown in Fig. 5 and which have not been specifically omitted as described above are as shown in Fig. 2.

In one embodiment of this modification the following quantities were used:

$E_{21}$=100 volts
$R_{20}$=50 megohms
$C_{24}$=5 micromicrofarads
$R_{27}$=50 ohms
$F$=100 cycles Significant harmonics were obtained from this equipment up to 50 mc.

The use of the thyratron rather than the mechanical contact is to be preferred because of the superior regularity and uniformity of the thyratron discharge as compared to the mechanical switch discharge, but the mechanical switch avoids the requirement of a trigger pulse oscillator.

It is clear that my standard pulse signal is not restricted in its use to measuring pulse field strength. It may be used to measure any noise input voltage by inserting the signal from the generator in the circuit in which the noise to be measured is received.

My standard pulse signal generator may be used to measure the responsiveness of a selected receiver to pulse interference. In that case the selected receiver is connected as is receiver 2 in Fig. 1 with switch 5 connecting it to dummy antenna 4. (Antenna 3 is now superfluous.) The signal generator 1 is set at a standard pulse rate and the attenuator 11 is adjusted to cause a standard output from the selected receiver. The output of signal generator 1 is an inverse measure of the response of the selected receiver to pulse interference.

A further use of my standard pulse signal generator is to measure the comparative response characteristics of the members of a group of receivers of the same type, such as are found in a production line. In such a group the ratio of pulse response to continuous wave response at a given receiver adjustment is constant, so that the relative pulse response may be used as a measure of the relative continuous wave response. The apparatus is again arranged as in Fig. 1 with the receiver connected to dummy antenna 4. (Antenna 3 and even switch 5 are again superfluous.) As previously stated meters 8 and 9 may consist of a speaker; accordingly no modification of a common receiver is necessary to accomplish a test. With the pulse signal generator 1 adjusted to predetermined output, the outputs of the receivers may be compared; or the generator may be adjusted for a predetermined output at each receiver. It is assumed that the pass band width of such receivers would be reasonably uniform. In such measurements my standard pulse signal generator has the advantage over the normal type of continuous wave signal generators that it does not need to be tuned to the receiver with which it is to be used.

My pulse signal generator in conjunction with a determination of the pass band width of a radio device may in general be used to determine the characteristics of the device in place of a conventional continuous wave standard signal generator. It has the advantage over the conventional signal generator that it requires no tuning adjustment and is very economical as a source of signals of known amplitude. The response to pulse signals may be determined as before and the pass band width may be readily determined from a signal of unknown amplitude by methods known in the art, such as varying either the signal or the tuning of the radio by a known frequency until the limits of the pass band are indicated by a substantial reduction in output. Conversely my standard pulse signal generator in conjunction with a conventional continuous wave signal generator may be used to determine the pass band width of a receiver by comparing the outputs due to pulse and continuous wave and thereby calculating the band width.

This method of determining pass band width would often be quicker than manipulating the frequency, particularly if great numbers of determinations were desired. Such measurements are based on the relation that the response of a radio device to a set of uniform signals densely distributed in frequency equals the product of the response to a signal of a single frequency multiplied by the number of the set contained within the effective pass band of the device.

Having described the principles of my invention in connection with specific apparatus, I nevertheless wish it clearly understood that the specific illustrations and description are made by way of example only and not as a limitation on the scope of my invention as set forth in the objects.

I claim:

1. An electronic pulse generator comprising a gaseous discharge tube having at least a cathode, a control grid receptive of trigger pulses, and a plate; a plate voltage supply, a high resistance connecting said plate voltage supply to said plate; a first capacitor-resistor discharge circuit connected between said plate and said cathode of small capacity and resistance and having a very short time constant whereby a very sharp pulse is produced upon discharge through said tube, and a second capacitor-resistor discharge circuit connected between said plate and said cathode of larger capacity and resistance and having a longer time constant whereby said discharge is substantially quenched.

2. A standard pulse signal generator comprising a trigger oscillator which generates a train of electric trigger pulses of known variable pulse rate, a gaseous discharge tube having a cathode, control grid, and plate, a plate voltage supply, a high resistance connecting said plate voltage supply to said plate, means for applying said trigger pulses to said grid, a first capacitor-resistor discharge circuit connected between said plate and said cathode of small capacity and resistance and having a very short time constant whereby a very sharp pulse is produced during said discharge, a second capacitor-resistor discharge circuit connected between said plate and said cathode of larger capacity and resistance and having a longer time constant whereby said discharge is substantially quenched.

3. An electric pulse generator comprising a trigger oscillator for generating a train of electronic triggering pulses, a gaseous discharge tube having a cathode, a control grid and a plate, a plate voltage supply, a high resistance connecting said plate supply to said plate, means for applying said triggering pulses to said grid whereby said tube is discharged, first discharge circuit means connected to the output of said tube whereby very sharp pulses are produced during said discharge and second discharge circuit means connected to said output for substantially quenching said discharge subsequent thereto.

HUNTER C. GOODRICH, JR.

REFERENCES CITED

The following references are of record in the file of this patent:

UNITED STATES PATENTS

| Number | Name | Date |
|---|---|---|
| 1,647,349 | Friis | Nov. 1, 1927 |
| 2,079,205 | Gillett | May 4, 1937 |
| 2,083,202 | Schlesinger | June 8, 1937 |
| 2,137,351 | Schlesinger | Nov. 22, 1938 |
| 2,144,779 | Schlesinger | Jan. 24, 1939 |
| 2,173,180 | Peterson | Sept. 19, 1939 |
| 2,185,635 | Kock et al. | Jan. 2, 1940 |
| 2,188,611 | Norton | Jan. 30, 1940 |
| 2,240,788 | Kock | May 6, 1941 |
| 2,252,058 | Bond | Aug. 12, 1941 |
| 2,312,810 | Finch | Mar. 2, 1943 |
| 2,416,327 | Labin | Feb. 25, 1947 |
| 2,420,211 | Tourshou | May 6, 1947 |
| 2,421,016 | Deloraine | May 27, 1947 |